United States Patent [19]
Eryurek et al.

[11] Patent Number: 5,828,567
[45] Date of Patent: Oct. 27, 1998

[54] DIAGNOSTICS FOR RESISTANCE BASED TRANSMITTER

[75] Inventors: Evren Eryurek, Minneapolis; Gary Lenz, Eden Prairie, both of Minn.

[73] Assignee: Rosemount Inc., Eden Prairie, Minn.

[21] Appl. No.: 744,980

[22] Filed: Nov. 7, 1996

[51] Int. Cl.[6] ................................................. G06F 19/00
[52] U.S. Cl. ........................... 364/184; 395/61; 702/182
[58] Field of Search ................................ 364/184–187, 364/550, 551.01, 551.02, 474.16, 474.17, 474.19, 474.37; 395/900, 912, 914, 61; 702/34, 176, 177, 182, 183, 184, 187; 374/198, 210

[56] References Cited

U.S. PATENT DOCUMENTS

| | | | |
|---|---|---|---|
| Re. 29,383 | 9/1977 | Gallatin et al. | 137/14 |
| 3,096,434 | 7/1963 | King | 235/151 |
| 3,404,264 | 10/1968 | Kugler | 235/194 |
| 3,701,280 | 10/1972 | Stroman | 73/194 |
| 4,058,975 | 11/1977 | Gilbert et al. | 60/39.28 |
| 4,337,516 | 6/1982 | Murphy et al. | 364/551 |
| 4,517,468 | 5/1985 | Kemper et al. | 290/52 |
| 4,530,234 | 7/1985 | Cullick et al. | 73/53 |
| 4,635,214 | 1/1987 | Kasai et al. | 364/551 |
| 4,707,796 | 11/1987 | Calabro et al. | 364/552 |
| 4,733,361 | 3/1988 | Krieser et al. | 364/508 |
| 4,777,585 | 10/1988 | Kokawa et al. | 364/164 |
| 4,831,564 | 5/1989 | Suga | 364/551.01 |

(List continued on next page.)

FOREIGN PATENT DOCUMENTS

| | | |
|---|---|---|
| 0 122 622 | 10/1984 | European Pat. Off. . |
| 0 413 814 A1 | 2/1991 | European Pat. Off. . |
| 928704 | 6/1963 | France . |
| 2 334 827 | 8/1977 | France . |
| 35 40 204 C1 | 9/1986 | Germany . |
| 40 08 560 A1 | 9/1990 | Germany . |
| 64-1914 | 1/1989 | Japan . |
| 64-72699 | 3/1989 | Japan . |
| 64 001914 A | 4/1989 | Japan . |
| 5-122768 | 5/1993 | Japan . |
| 6-19729 | 3/1994 | Japan . |
| 06 242192 A | 11/1994 | Japan . |

(List continued on next page.)

OTHER PUBLICATIONS

"Taking Full Advantage of Smart Transmitter Technology Now," by G. Orrison, *Control Engineering*, vol. 42, No. 1, Jan. 1995.

"A Decade of Progress in High Temperature Johnson Noise Thermometry," *American Institute of Physics*, by T.V. Blalock and R.L. Shepard, 1982 pp. 1219–1223.

"An Integrated Architecture For Signal Validation in Power Plants," *Third IEEE International Symposium on Intelligent Control*, by B.R. Upadhyaya et al., Aug. 24–26, 1988, pp. 1–6.

"Application of Neural Computing Paradigms for Signal Validation," *Department Nuclear Engineering*, by B.R. Upadhyaya, E. Eryurek and G. Mathai, pp. 1–18, date unknown.

(List continued on next page.)

*Primary Examiner*—Joseph Ruggiero
*Attorney, Agent, or Firm*—Westman, Champlin & Kelly, P.A.

[57] ABSTRACT

Transmitter in a process control system includes a resistance sensor sensing a process variable and providing a sensor output. Sensor monitoring circuitry coupled to the sensor provides a secondary signal related to the sensor. Analog-to-digital conversion circuitry coupled to the sensor output and the sensor monitoring circuitry provides a digitized sensor output and a digitized secondary signal. Output circuitry coupled to a process control loop transmits a residual life estimate related to residual life of the sensor. A memory stores a set of expected results related to the secondary signal and to the sensor. Diagnostic circuitry provides the residual life estimate as a function of the expected results stored in the memory, the digitized sensor output and the digitized secondary signal.

22 Claims, 4 Drawing Sheets

U.S. PATENT DOCUMENTS

| | | | |
|---|---|---|---|
| 4,873,655 | 10/1989 | Kondraske | 364/553 |
| 4,907,167 | 3/1990 | Skeirik | 364/500 |
| 4,934,196 | 6/1990 | Romano | 73/861.38 |
| 4,992,965 | 2/1991 | Hölter et al. | 364/551.01 |
| 5,005,142 | 4/1991 | Lipchak et al. | 364/550 |
| 5,043,862 | 8/1991 | Takahashi et al. | 364/162 |
| 5,098,197 | 3/1992 | Shepard et al. | 374/120 |
| 5,111,531 | 5/1992 | Grayson et al. | 395/23 |
| 5,121,467 | 6/1992 | Skeirik | 395/11 |
| 5,122,976 | 6/1992 | Bellows et al. | 364/550 |
| 5,142,612 | 8/1992 | Skeirik | 395/11 |
| 5,148,378 | 9/1992 | Shibayama et al. | 364/571.07 |
| 5,167,009 | 11/1992 | Skeirik | 395/27 |
| 5,175,678 | 12/1992 | Frerichs et al. | 364/148 |
| 5,197,114 | 3/1993 | Skeirik | 395/22 |
| 5,197,328 | 3/1993 | Fitzgerald | 73/168 |
| 5,212,765 | 5/1993 | Skeirik | 395/11 |
| 5,214,582 | 5/1993 | Gray | 364/424.03 |
| 5,224,203 | 6/1993 | Skeirik | 395/22 |
| 5,228,780 | 7/1993 | Shepard et al. | 374/175 |
| 5,235,527 | 8/1993 | Ogawa et al. | 364/571.05 |
| 5,251,144 | 10/1993 | Ramamurthi | 364/474.19 |
| 5,274,572 | 12/1993 | O'Neill et al. | 364/550 |
| 5,282,131 | 1/1994 | Rudd et al. | 364/164 |
| 5,282,261 | 1/1994 | Skeirik | 395/22 |
| 5,303,181 | 4/1994 | Stockton | 365/96 |
| 5,305,230 | 4/1994 | Matsumoto et al. | 364/495 |
| 5,311,421 | 5/1994 | Nomura et al. | 364/157 |
| 5,317,520 | 5/1994 | Castle | 364/482 |
| 5,327,357 | 7/1994 | Feinstein et al. | 364/502 |
| 5,329,465 | 7/1994 | Arcella et al. | 364/551.01 |
| 5,333,240 | 7/1994 | Matsumoto et al. | 395/23 |
| 5,349,541 | 9/1994 | Alexandro, Jr. et al. | 364/578 |
| 5,357,449 | 10/1994 | Oh | 364/551.01 |
| 5,361,628 | 11/1994 | Marko et al. | 73/116 |
| 5,365,423 | 11/1994 | Chand | 364/140 |
| 5,367,612 | 11/1994 | Bozich et al. | 395/22 |
| 5,384,699 | 1/1995 | Levy et al. | 364/413.13 |
| 5,394,341 | 2/1995 | Kepner | 364/551.01 |
| 5,404,064 | 4/1995 | Mermelstein et al. | 310/319 |
| 5,408,406 | 4/1995 | Mathur et al. | 364/163 |
| 5,408,586 | 4/1995 | Sheirik | 395/23 |
| 5,414,645 | 5/1995 | Hirano | 364/551.01 |
| 5,419,197 | 5/1995 | Ogi et al. | 73/659 |
| 5,430,642 | 7/1995 | Nakajima et al. | 364/148 |
| 5,469,735 | 11/1995 | Watanbe | 73/118.1 |
| 5,483,387 | 1/1996 | Bauhahn et al. | 359/885 |
| 5,485,753 | 1/1996 | Burns et al. | 73/720 |
| 5,486,996 | 1/1996 | Samad et al. | 364/152 |
| 5,488,697 | 1/1996 | Kaemmerer et al. | 395/51 |
| 5,489,831 | 2/1996 | Harris | 318/701 |
| 5,528,940 | 6/1996 | Yamamoto et al. | 73/708 |
| 5,561,599 | 10/1996 | Lu | 364/164 |
| 5,570,300 | 10/1996 | Henry et al. | 364/551.01 |
| 5,572,420 | 11/1996 | Lu | 364/153 |
| 5,598,521 | 1/1997 | Kilgore et al. | 395/326 |
| 5,600,148 | 2/1997 | Cole et al. | 250/495.1 |
| 5,608,845 | 3/1997 | Ohtsuka et al. | 364/551.01 |

FOREIGN PATENT DOCUMENTS

| | | |
|---|---|---|
| 7-63586 | 3/1995 | Japan. |
| 07 234988 A | 1/1996 | Japan. |
| 8-136386 | 5/1996 | Japan. |
| 8-166309 | 6/1996 | Japan. |
| WO 97/21157 | 6/1997 | WIPO. |

OTHER PUBLICATIONS

"Application of Johnson Noise Thermometry to Space Nuclear Reactors," *Presented at the 6th Symposium on Space Nuclear Power Systems,* by M.J. Roberts, T.V. Blalock and R.L. Shepard, Jan. 9–12, 1989.

"Automated Generation of Nonlinear System Characterization for Sensor Failure Detection," *ISA,* by B.R. Upadhyaya et al., 1989 pp. 269–274.

"Development of a Long–Life, High–Reliability Remotely Operated Johnson Noise Thermometer," *ISA,* by R.L. Shepard et al., 1991, pp. 77–84.

"Development and Application of Neural Network Algorithms For Process Diagnostics," *Proceedings of the 29th Conference on Decision and Control,* by B.R. Upadhyaya et al., 1990, pp. 3277–3282.

"Fuzzy Logic and Artificial Neural Networks for Nuclear Power Plant Applications," *Prodeedings of the American Power Conference,* R.C. Berkan et al. Date Unknown.

"Software–Based Fault–Tolerant Control Design for Improved Power Plant Operation," *IEEE/IFAC Joint Symposium on Computer–Aided Control System Design,* Mar. 7–9, 1994 pp. 585–590.

"In Situ Calibration of Nuclear Plant Platinum Resistance Thermometers Using Johnson Noise Methods," *EPRI,* Jun. 1983.

"Integration of Multiple Signal Validation Modules for Sensor Monitoring," *Department of Nuclear Engineering,* by B. Upadhyaya et al. Jul. 8, 1990 pp. 1–6.

"Johnson Noise Power Thermometer and its Application in Process Temperature Measurement," *American Institute of Physics* by T.V. Blalock et al., 1982, pp. 1249–1259.

"Johnson Noise Thermometer for High–Radiation and High–Temperature Environments," *Fifth Symposium on Space Nuclear Power Systems,* by L. Oakes et al., Jan. 1988, pp. 2–23.

"Neural Networks for Sensor Validation and Plant Monitoring," *International Fast Reactor Safety Meeting,* by B. Upadhyaya, et al., Aug. 12–16, 1990, pp. 2–10.

"Neural Networks for Sensor Validation and Plantwide Monitoring," by E. Eryurek, et al., vol. XII, No. 1–2, Jan./Feb. 1992.

"Noise Thermometry for Industrial and Metrological Applications at KFA Julich," *7th International Symposium on Temperature,* by H. Brixy et al. 1992.

"Application of Neural Networks for Sensor Validation and Plant Monitoring," *Nuclear Technology,* by B. Upadhyaya, et al., vol. 97, No. 2, Feb. 1992 pp. 170–176.

Parallel, Fault–Tolerant Control and Diagnostics System for Feedwater Regulation in PWRS, *Proceedings of the American Power Conference,* by E. Eryurek et al; date unknown.

"Sensor Validation for Power Plants Using Adaptive Back-propagation Neural Network," *IEEE Transactions on Nuclear Science,* vol. 37, No. 2, by E. Eryurek et al. Apr. 1990, pp. 1040–1047.

"Survey, Applications, And Prospects of Johnson Noise Thermometry," *Electrical Engineering Department,* by T. Blalock et al. 1981 pp. 2–11.

"Tuned–Circuit Dual–Mode Johnson Noise Thermometers," by R.L. Shepard, 1992.

"Tuned–Circuit Johnson Noise Thermometry," *7th Symposium on Space Nuclear Power Systems,* by Michael Roberts et al., Jan. 1990.

"Using Artificial Neural Networks to Identify Nuclear Power Plant States," by Israel E. Alguindigue et al., pp. 1–4; date unknown.

"Wavelet Analysis of Vibration, Part I: Theory[1]," *Journal of Vibration and Acoustics,* by D.E. Newland, vol. 116, Oct. 1994, pp. 409–416.

"Wavelet Analysis of Vibration, Part 2 : Wavelet Maps," *Journal of Vibration and Acoustics,* by D.E. Newland, vol. 116, Oct. 1994, pp. 417–425.

"Advanced Control Technologies Inspire Asset Management", *Plant Services,* by Mark Boland, Oct. 1996, pp. 27–32.

"PRT Handbook Reference for Precision Temperature Sensing Devices", by Rosemount Inc., 1986, Bulletin 1042.

"Smart Field Devices Provide New Process Data, Increase System Flexibility", *I&CS,* by Mark Boland, Nov. 1994, pp. 46–51.

"Field–Based Architecture is Based on Open Systems, Improves Plant Performance", *I&CS,* by Peter Cleaveland, Aug. 1996, pp. 73–74.

"Sensor and Device Diagnostics for Predicitve and Proactive Maintenance", *A Paper Presented at the Electric Power Research Institute–Fossil Plant Mainenance Conference,* by B. Boynton, Jul. 29–Aug. 1, 1996, pp. 50–1–50–6.

"Detecting Blockage in Process Connections of Differential Pressure Transmitters", by E. Taya et al., Development & Engineering Dept., Yokogawa Electric Corporation, pp. 1605–1608; date unknown.

"Intelligent Behaviour for Self–Validating Sensors", *Advances In Measurement,* by M.P. Henry, pp. 1–7, (May 1990).

"Keynote Paper: Hardware Compilation–A New Technique for Rapid Prototyping of Digital Systems–Applied to Sensors Validation", *Control Eng. Practice,* by M.P. Henry, vol. 3, No. 7., pp. 907–924, (1995).

"Programmable Hardware Architectures for Sensor Validation", *Control Eng. Practice,* by M.P. Henry et al., vol. 4, No. 10., pp. 1339–1354, (1996).

"Signal Processing, Data Handling and Communications: The Case for Measurement Validation", by M.P. Henry, Department of Engineering Science, Oxford University; date unknwon.

A Standard Interface for Self–Validating Sensors, *Report No. QUEL 1884/91,* by M.P. Henry et al., (1991).

"Implications of Digital Communications on Sensor Validation", *Report No. QUEL* 1912/92, by M. Henry et al., (1992).

"Smart Temperature Measurement in the '90s", *C&I,* by T. Kerlin et al., (1990).

"In–Situ Response Time Testing of Thermocouples", *ISA,* by H.M. Hashemian et al., Paper No. 89–0056, pp. 587–593, (1989).

"A Fault–Tolerant Interface for Self–Validating Sensors", *IEE Colloquium,* by M.P. Henry, pp. 3/1–3/2, Digest No. 1990/145; Nov. 1990.

DIAGNOSTICS FOR RESISTANCE BASED TRANSMITTER

BACKGROUND OF THE INVENTION

The present application incorporates by reference co-pending and commonly assigned U.S. patent applications Ser. No. 08/582,514, filed Jan. 3, 1996, entitled TEMPERATURE TRANSMITTER WITH ON-LINE CALIBRATION USING JOHNSON NOISE, Ser. No. 08/582,515, filed Jan. 3, 1996, entitled TEMPERATURE SENSOR TRANSMITTER WITH SENSOR SHEATH LEAD, now U.S. Pat. No. 5,700,090 and Ser. No. 08/623,569, filed Mar. 28, 1996, entitled DEVICE IN A PROCESS SYSTEM FOR DETECTING EVENTS.

The present invention relates to transmitters of the type used in the process control industry. More specifically, the invention relates to diagnostics for process control transmitters.

Process control transmitters are used to monitor process variables in industrial processes. For example, a transmitter might monitor pressure, temperature or flow and transmit such information back to a control room. Furthermore, some transmitters are capable of performing the control function directly. In order to monitor a process variable, the transmitter must include some type of a sensor. For example, transmitters include sensors with resistances or capacitances which vary in response to broad temperature, deformations or strain which allow the transmitter to measure, for example, temperature, pressure, flow, level, pH or turbidity.

As sensors age or are subjected to harsh environmental conditions, the accuracy of the sensor tends to degrade. It is possible to compensate for this degradation by periodically recalibrating the transmitter. Typically, this requires an operator to enter the field and perform a calibration process on the transmitter. This is both inconvenient and time consuming for the operator. Further, it is difficult to determine the condition of a sensor, prior to its ultimate failure.

It is also necessary for the sensors to be periodically replaced as they age. However, it is difficult to determine precisely when a replacement is necessary. Therefore, sensors are typically replaced well before their failure or they fail unexpectedly.

SUMMARY OF THE INVENTION

A transmitter in a process control system includes a resistance-based sensor sensing a process variable and providing a sensor output. Sensor monitoring circuitry coupled to the sensor provides a secondary signal related to the sensor. Analog-to-digital conversion circuitry coupled to the sensor output and the sensor monitoring circuitry provides a digitized sensor output and at least one digitized secondary signal. The six secondary signals include change in sensor resistance ($\Delta R_1$), sheath to lead voltage ($V_P$), insulation resistance ($R_{IR}$), change in $\alpha$ ($\Delta\alpha$), change in $\delta$ ($\Delta\delta$) and self heating (SH). A memory stores a set of expected results related to the secondary signal and to the sensor. Diagnostic circuitry provides the residual life estimate as a function of the expected results stored in the memory, the digitized sensor output and the digitized secondary signal. Output circuitry coupled to a process control loop transmits a residual life estimate related to residual life of the sensor.

DETAILED DESCRIPTION OF THE PREFERRED EMBODIMENTS

Figure 1:
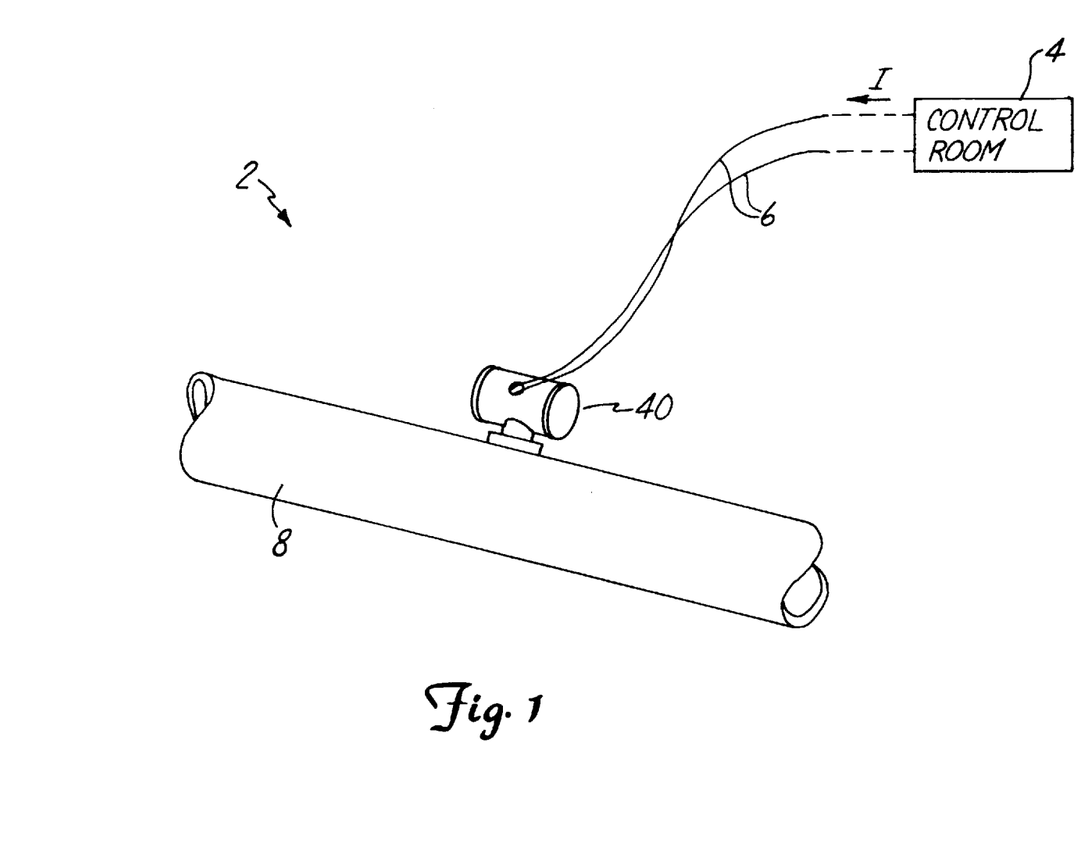
FIG. 1 shows a process control system including a transmitter in accordance with the present invention.

FIG. 1 is a diagram of process control system 2 including field mounted transmitter 40 coupled to control room 4 over a two wire process control loop 6. Transmitter 40 monitors the temperature of process fluid in process piping 8, but the present invention applies to any resistance based process variable measurement such as a resistance based pressure measurement. Transmitter 40 transmits temperature information to control room 4 over loop 6 by controlling the current flowing through loop 6. For example, the current flowing through loop 6 may be controlled between 4 and 20 mA and properly calibrated to indicate temperature. Additionally or in the alternative, transmitter 40 may transmit digital information related to temperature over loop 6 to control room 4 such as in a HART® or Fieldbus protocol. Transmitter 40 includes circuitry described herein in more detail which provides advanced diagnostics related to temperature sensor operation.

Figure 2:
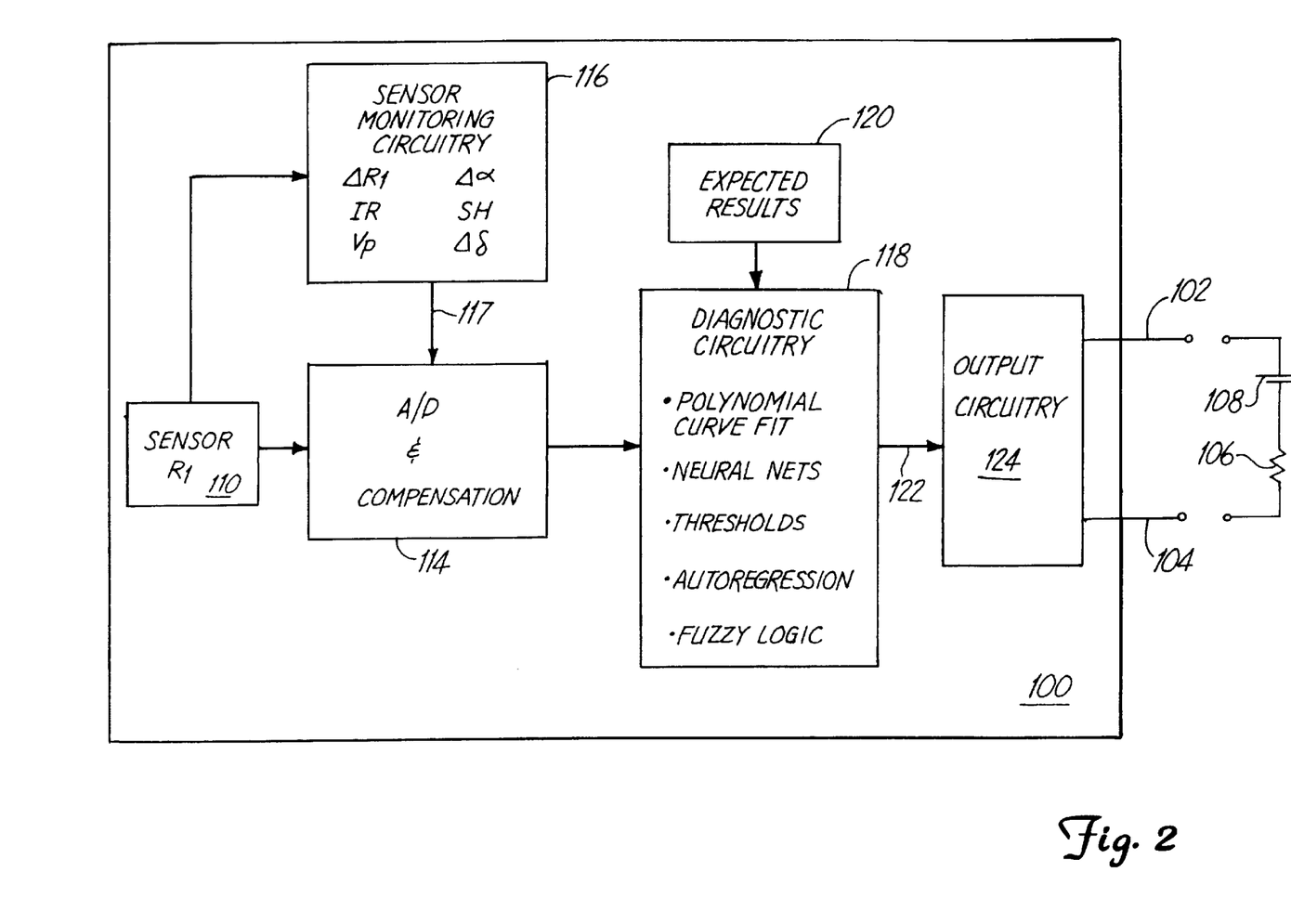
FIG. 2 is a block diagram of a transmitter of the present invention.

A block diagram of the present invention in a process control transmitter is shown in FIG. 2. Transmitter 100 typically is configured as a two-wire transmitter, having two terminals 102, 104 which are electrically coupled to a controller which provides power for and communicates with transmitter 100. The controller is electrically modeled in FIG. 2 as resistor 106 in series with voltage supply 108. Transmitter 100 may also practice the invention as a three or four wire transmitter.

The present invention can also be practiced in software which is resident in any of a number of places in a process system control system. In particular, the present invention as realized in software, can reside in a control system or even a final control element such as a valve, motor or switch. Furthermore, modern digital protocols such as Fieldbus, Profibus and others allow for the software which practices the present invention to be communicated between elements in a process control system, and also provide for process variables to be sensed in one transmitter and then sent to the software.

A resistance based sensor $R_1$, labelled at 110, senses a process variable in a process. The process variable may be representative of pressure, temperature or other process variables which affect the resistance of sensor $R_1$. Sensor 110 may be a piezoresistance based sensor, as is commonly used for sensing pressures, or a platinum resistance thermometer (PRT), which is commonly used for sensing temperature in a process control application. Output from sensor 110, which is an analog signal, is signal conditioned and digitized appropriately in A/D and compensation circuit 114. Output from sensor 110 also is electrically connected to sensor monitoring circuitry 116, which outputs onto bus 118 secondary signals representative of the change in resistance of sensor 110 ($\Delta R_1$), insulation resistance ($R_{IR}$), case or sheath to lead voltage ($V_P$), change in alpha ($\Delta\alpha$), change in delta ($\Delta\delta$) and self heating (SH). Specifics of the circuits necessary for measuring each of the secondary signals are discussed below. A/D and compensation circuit 114 also compensates the primary variable, $R_1$, for known repeatable errors via a look-up table or other method, such as a polynomial curvefit equation. Circuit 114 is preferably realized in a low power microprocessor, so as to conserve power. Conservation of power is important in the transmitter of the present invention because transmitter 100 is wholly powered over a two wire loop formed by transmitter 100; supply 108 and resistor 106.

The digitized primary process variable sensed by sensor 110 in transmitter 100 and the digitized secondary signals are coupled to diagnostic circuitry 118. Again with the intent of minimizing power consumption of transmitter 100, diagnostic circuitry 118 is preferably implemented in a low power microprocessor such as the Motorola 6805HC11.

A memory containing expected results (sometimes expressed as nominal values) for each of the secondary signals is labeled 120. The output of memory 120 is used as needed by the diagnostic circuitry 118 to provide an output 122 indicating the residual life of sensor 110 (a "residual life estimate"). For secondary signal $\Delta R_1$, for instance, memory 120 stores a value representative of the expected change, or drift in the resistance of sensor 110 over a specific time period. The amount of expected change is dependent on the type of sensor used, how it is manufactured, and the accuracy, in terms of drift, of the specific application for transmitter 100. The stored $\Delta R_1$ is typically determined empirically by testing a number of production samples of sensor 110 and calculating an appropriate $\Delta R_1$ number to store. Similarly, a value for $R_{IR}$ is stored in memory 120. The value of stored $R_{IR}$ is also empirically determined based on a number of production samples of sensor 110, and is representative of the impedance between a sheath of sensor 110 and sensor 110. Rosemount, the assignee of the present application, manufactures a number of types of PRTs, which may be used as sensor 110, and each type has a specified sheath to sensor impedance IR. A value for $V_P$ is also stored in memory 120. The value of $V_P$ is representative of the voltage between sensor 110 and the sheath, and should ideally be substantially zero. However, if moisture enters the sensor, the different metals in the sensor can generate a voltage through galvanic coupling. Empirical values of approximately zero are stored in memory 120 for this secondary signal after review of $V_P$ for a number of production samples. A value for $\Delta\alpha$ and $\Delta\delta$ are also stored in memory 120, and are related to the temperature versus resistance characteristic for a PRT sensor 110. Manufacturing processes and specified accuracies set the expected values for $\Delta\alpha$ and $\Delta\delta$, based on empirical testing of a number of production samples of sensor 110. A value for SH is also stored in memory 120. The value of SH is representative of the expected time constant for cooling, or heating a PRT sensor 110 after a small deviation in the current is pulsed through the sensor.

Diagnostic circuitry 118 receives the contents of memory 120 and calculates a residual lifetime estimate 122. Diagnostic circuitry calculates a residual lifetime estimate of sensor 110 as a function of the expected results, the digitized output from sensor 110 and a digitized secondary signal. A preferred embodiment for the calculation method used in circuitry 118 is a set of polynomials. However, circuitry 118 can also be realized in a number of other ways, including neural nets, threshold circuits, autoregression models and fuzzy logic.

Output circuitry 124 receives the residual life estimate from circuitry 118, as well as the conditioned output from sensor 110, and outputs it to the two wire loop, as appropriate.

Figure 3:
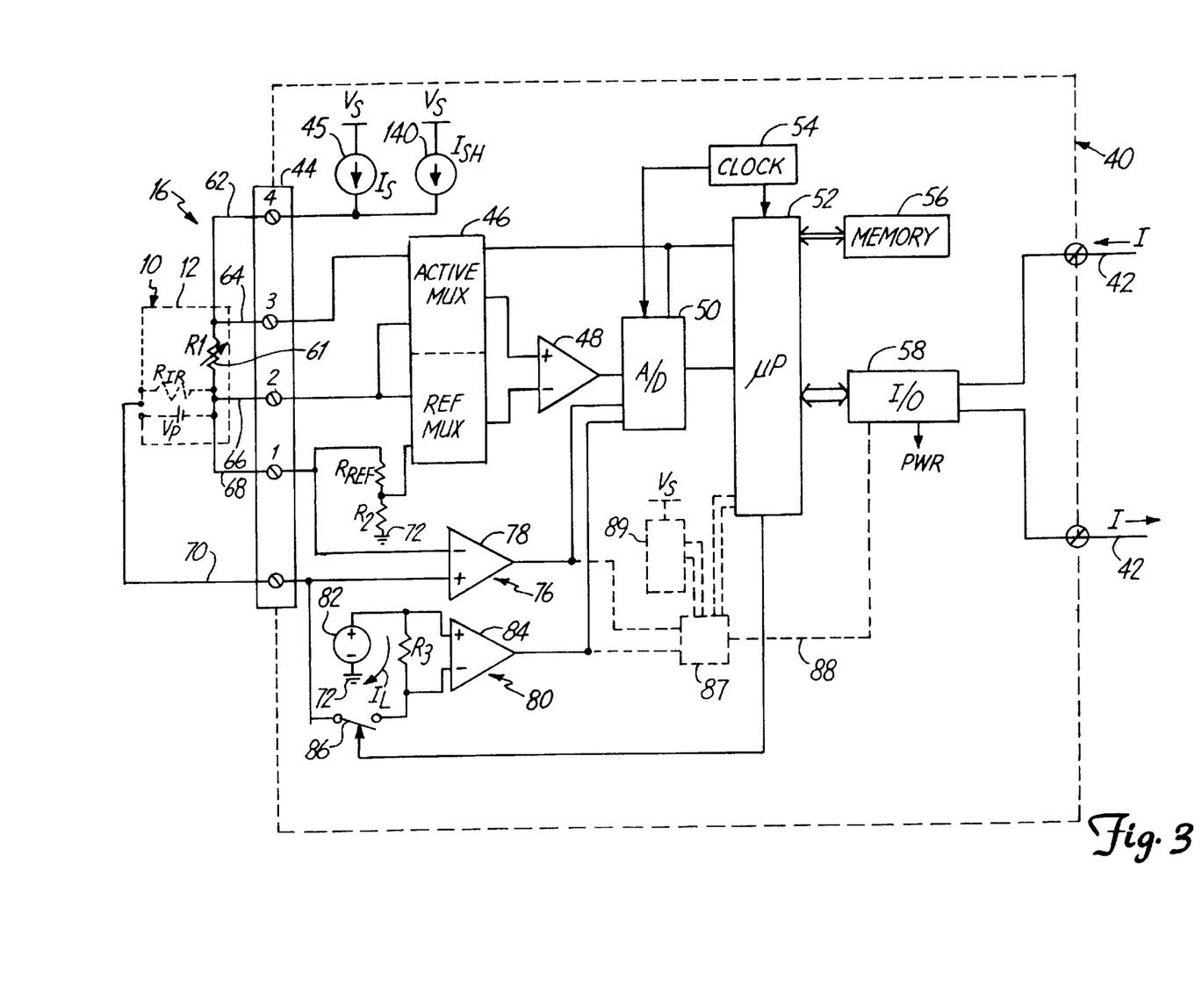
FIG. 3 is a simplified block diagram of a transmitter in accordance with one embodiment of the invention.

FIG. 3 is a block diagram of a temperature transmitter 40 connected to RTD temperature sensor 10 in accordance with the present invention. Transmitter 40 includes terminal block 44, current source 45, multiplexer 46, differential amplifier 48, high accuracy A/D converter 50, microprocessor 52, clock circuit 54, memory 56 and input-output circuit 58.

Terminal block 44 includes terminals 1 through 5 for coupling to, for example, RTD temperature sensor 10 or a thermocouple temperature sensor 60 (shown in FIG. 5). Sensor 10 (and sensor 60) can be either internal or external to transmitter 40. Sensor 10 includes RTD sensor element 61 having a resistance $R_1$ which varies with changes in the ambient temperature immediately surrounding sheath 12. Leads 16 include four element leads 62, 64, 66 and 68, and a sheath lead 70. Lead 62 is connected between sensor element 61 and terminal 4, lead 64 is connected between sensor element 61 and terminal 3, lead 66 is connected between sensor element 61 and terminal 2, and lead 68 is connected between sensor element 61 and terminal 1. Sheath lead 70 is connected between sensor sheath 12 and terminal 5.

Current source 45 is connected to terminal block 44 and supplies a measurement current $I_s$ through terminal 4, sensor element 61, terminal 1, reference resistance $R_{REF}$, pull-down resistance $R_2$ and ground terminal 72. Sensor element 61 develops a voltage drop across terminals 2 and 3 which is a function of the resistance $R_1$ and thus the temperature of sensor element 61. Reference resistor $R_{REF}$ is connected between terminal 1 and pull-down resistor $R_2$.

Multiplexer 46 is divided into two sections, an active multiplexer having an output connected to the non-inverting input of differential amplifier 48 and a reference multiplexer having an output connected to the inverting input of differential amplifier 48. Microprocessor 52 controls multiplexer 46 to multiplex appropriate sets of analog signals, including signals from terminals 1 through 3, to the non-inverting and inverting inputs of differential amplifier 48. Differential amplifier 48 has an output connected to A/D converter 50. In one embodiment, A/D converter 50 has an accuracy of 17 bits and a conversion rate of 14 samples/second. A/D converter 50 converts the voltage at the output of differential amplifier 48 into a digital value and provides that value to microprocessor 52 for analysis or for communication over process control loop 42 through input-output circuit 58.

Input-output circuit 58, in a preferred embodiment, includes a HART® communication section, a FIELDBUS communication section and a 4–20 mA analog loop section for analog or bi-directional digital communicating over loop 42 according to a selected protocol in a known manner. Other protocols can also be used, for example, a four-wire configuration may be employed in which power is received from a separate source. Loop 42 also provides power to the various components of transmitter 40 through input-output circuit 58. Transmitter 40 is wholly (completely) powered by the two-wire loop 42.

Memory 56 stores instructions and information for microprocessor 52, which operates at a speed determined by clock circuit 60. Clock circuit 60 includes a real time clock and a precision high speed clock, which are also used to sequence the operation of A/D converter 50. Microprocessor 52 performs several functions, including control of multiplexer 46 and A/D converter 50, control of communication over loop 42, temperature calculations, drift correction, circuitry diagnostics, storage of transmitter configuration parameters and performing sensor diagnostics.

Microprocessor 52 employs the following equation to compute the major value of the temperature of RTD sensor element 61:

$$R_1 = \frac{V_{R1}}{V_{RREF}} (R_{REFNOM}) \quad \text{Equation 1}$$

where:

$R_1$=resistance of RTD sensor element 61;

$V_{R1}$=voltage drop across the RTD sensor element 61;

$V_{RREF}$=voltage drop across resistance $R_{REF}$; and $R_{REFNOM}$=nominal resistance of the reference resistance $R_{REF}$ in Ohms, and/or stored in memory 56.

Microprocessor 52 measures the voltage drop $V_{R1}$ across RTD sensor element 61 between terminals 2 and 3, and the voltage drop ($V_{RREF}$) across reference resistance $R_{REF}$ with multiplexer 46. In a four-wire resistance measurement such as the one shown in FIG. 2, the voltage drop across the connections to terminals 2 and 3 is largely eliminated, since substantially all of the current $I_S$ flows between terminals 1 and 4, and has little impact on the accuracy of the measurement. Microprocessor 52 converts the measured resistance $R_1$ into temperature units with a look-up table or suitable equations stored in memory 30.

Johnson noise can also be used to measure resistance for use in measuring resistance of PRT sensor 61 or for uses, as appropriate, in the measurement of six secondary signals below.

II. MEASUREMENT OF SECONDARY SIGNALS

The present invention measures, or determines, secondary signals/inputs which are used in performing advanced diagnostics on the transmitter. The secondary signals include: change in sensor resistance ($\Delta R_1$), sheath to lead voltage ($V_P$), insulation resistance ($R_{IR}$), change in $\alpha$ ($\Delta\alpha$), change in delta ($\Delta\delta$), and self heating (SH)

A. Change In Sensor Resistance

Change in sensor resistance ($\Delta R_1$) of RTD sensor element 61 is determined by monitoring $R_1$ as described above. Microprocessor monitors $R_1$ and time information using clock 54. Values of $R_1$ and the time at which they occurred is stored in memory 56. In one embodiment, only changes in $R_1$ and the time period over which the change occurred are stored.

B. Sheath To Lead Voltage And Insulation Resistance

Transmitter 40 may also determine sheath to lead voltage ($V_P$) and insulation resistance ($R_{IR}$) using a sheath-to-lead voltage measurement circuit 76 and an insulation resistance measurement circuit 80. Within temperature sensor 10, a sheath-to-lead voltage is sometimes generated between sensor sheath 12 and sensor element 61 because of dissimilar metals in the sensor being separated by an electrolyte made up of ceramic impurities (ionics) in the sensor and water entering into the system. The sheath-to-lead voltage is shown in phantom in FIG. 3 as a voltage source $V_P$. Transmitter 40 measures voltage $V_P$ through sheath-to-lead voltage measurement circuit 76. When measuring the sheath-to-lead voltage, microprocessor 52 turns off external voltage or current sources, such as current source 45, that are connected to temperature sensor 10 such that amplifier 78 measures only the voltage generated by electrolytic action in sensor 10.

Circuit 76 includes an amplifier 78 with an inverting input coupled to terminal 1, a non-inverting input coupled to terminal 5 and an output coupled to A/D converter 50. Amplifier 78 is therefore electrically placed across the insulation resistance barrier in sensor 10 (i.e. across sheath 12 and one of the element leads 62, 64, 66 and 68), so as to measure the voltage difference $V_P$ across this barrier. A/D converter 50 samples the sheath-to-lead voltage provided by amplifier 78 at a selected rate under the control of microprocessor 52. Microprocessor 52 stores the resulting voltage samples in memory 56, and determines a residual lifetime estimate as a function of the stored expected value of $V_P$ and the newly stored $V_P$ value, according to a polynomial equation.

Insulation resistance measurement circuit 80 measures the insulation barrier within sensor 10 between sensor sheath 12 and sensor element 61, which is represented in FIG. 3 by insulation resistance $R_{IR}$ (shown in phantom). Sensor sheath 12 should be electrically isolated from sensor element 61 and element leads 62, 64, 66 and 68. Insulation resistance $R_{IR}$ is the resistance between sensor sheath 12 and any one of the element leads 62, 64, 66 and 68. The insulation resistance $R_{IR}$ should be very high in a good sensor, on the order of 100–500 megohms. An insulation resistance below 1 megohm might be considered a failed sensor.

Measurement circuit 80 includes voltage source 82, measurement resistance $R_3$, amplifier 84 and switch 86. Voltage source 82 is connected between measurement resistance $R_3$ and ground terminal 72. Measurement resistance $R_3$ is connected in series with voltage source 82, switch 86 and insulation resistance $R_{IR}$, which is in series with reference resistance $R_{REF}$ and pull-down resistance $R_2$. Measurement resistance $R_3$, insulation resistance $R_{IR}$, reference resistance $R_{REF}$ and pull-down resistance $R_2$ form a current path from voltage source 82 to ground terminal 72. Current flowing through the current path is the leakage current from sensor sheath 12 to RTD sensor element $R_1$, which is a function of the insulation resistance $R_{IR}$. The voltage drop across measurement resistance $R_3$ is a function of the leakage current $I_L$ and thus the insulation resistance $R_{IR}$. The non-inverting and inverting inputs of amplifier 84 are connected across measurement resistance $R_3$ to measure the voltage drop across measurement resistance $R_3$. Amplifier 84 has a very low input bias current. The output of amplifier 84 is connected to A/D converter 50 which converts the voltage measurement to a digital value at a selected rate under the control of microprocessor 52. Microprocessor 52 stores the resulting digital values of $R_{IR}$ in memory 56. When microprocessor 52 makes an insulation resistance measurement, microprocessor 52 turns off current source 45 and closes switch 86 to connect measurement circuit 80 to terminal 5 to drive leakage current $I_L$ through insulation resistance $R_{IR}$. Once the measurement has been completed, microprocessor 52 opens switch 86, thereby disconnecting voltage source 82 from sensor sheath 12. The diagnostic circuitry within microprocessor 52 calculates a residual lifetime output based on the expected value of $R_{IR}$ stored in memory 56 and the newly measured value $R_{IR}$, according to a polynomial equation.

C. Measurement of Sensor Alpha ($\alpha$), and Delta ($\delta$):

Alpha ($\alpha$) and delta ($\delta$) are constants related to the slope of resistance versus temperature plot for a specific resistance based sensor. Their calculation is discussed in PRT Handbook Bulletin 1042, dated February 1985, published by Rosemount and incorporated by reference. Three different values of $R_1$ are stored in memory 56 sometimes taken over a start-up period for the process, sometimes taken over a period of days in order to get a sufficiently large difference between the $R_1$ values, before constants $\alpha$ and $\delta$ are calculated in microprocessor 52. Once calculated, the newly computed values of $\alpha$ and $\delta$ are compared to the expected values of $\alpha$ and $\delta$ stored in memory 56, to compute $\Delta\alpha$ and $\Delta\delta$.

A residual life estimate is computed from $\Delta\alpha$ and $\Delta\delta$ based on the magnitude of $\Delta\alpha$ and $\Delta\delta$, output to I/O circuitry 58 and sent over loop 42.

D. Self Heating

The self heating measurement is performed by injecting a known current $I_{SH}$ into RTD 61 using current source 140. Typically, other current paths are disconnected from RTD 61 so that the entire current $I_{SH}$ flows through RTD 61. Current $I_{SH}$ causes thermal heating of RTD 61 which results in a change of resistance $R_1$, measured as described above. The change in resistance $R_1$ due to current $I_{SH}$ is monitored by microprocessor 52 for use as described below.

Additionally, the technique can be used to determine the temperature time constant of the sensor. Immediately after the sensor current is returned to a normal level, a series of direct DC readings are taken to measure the time for the sensor temperature to return to a constant value again. The time constant is determined from this time period and provided as a secondary signal. If the process temperature is moving, this technique, taken many times over a period of time, is averaged out to get a final value. The value of the time constant changing over a long period of time indicates that the thermal connection between the sensor and t-well degrading or the insulation between the sensor element and sheath wearing or degrading.

III. DIAGNOSTIC CIRCUITRY

Microprocessor 52 performs diagnostics related to operation of transmitter 40 using at least one of the six secondary signals discussed above. The following describes a number of embodiments for realizing the diagnostic circuitry in transmitter 40. The residual lifetime estimate may be representative of an impending sensor failure. In one embodiment, the state of health output is indicative of the remaining life of the sensor such that sensor replacement may be timed appropriately. An alarm signal may also be sent to control room 4 prior to sensor failure.

A. Polynomial Curvefit

A preferred embodiment of diagnostic circuitry 52 in the present invention uses empirical models or polynomial curve-fitting.

A polynomial-like equation which has a combination of the six secondary signals as the variable terms in the polynomial, together with constants stored in memory 56 is used for computing the residual lifetime estimate. If transmitter memory is limited, the constants and/or the equation may be sent over the two wire loop to transmitter 40.

B. Neural Networks

Figure 4:
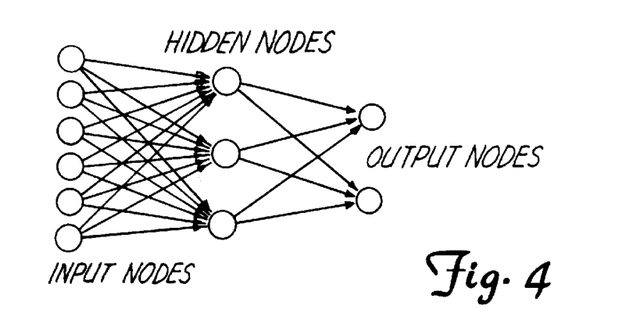
FIG. 4 is a diagram showing a simplified neural network.

One diagnostic circuit is implemented with a multi-layer neural network. Although a number of training algorithms can be used to develop a neural network model for different goals, one embodiment includes the known Backpropagation Network (BPN) to develop neural network modules which will capture the nonlinear relationship among a set of input and outputs(s). FIG. 4 shows a typical topology of a three-layer neural network architecture implemented in microprocessor 52 and memory 56. The first layer, usually referred to as the input buffer, receives the information, and feeds them into the inner layers. The second layer, in a three-layer network, commonly known as a hidden layer, receives the information from the input layer, modified by the weights on the connections and propagates this information forward. This is illustrated in the hidden layer which is used to characterize the nonlinear properties of the system analyzed. The last layer is the output layer where the calculated outputs (estimations) are presented to the environment.

Figure 5A:
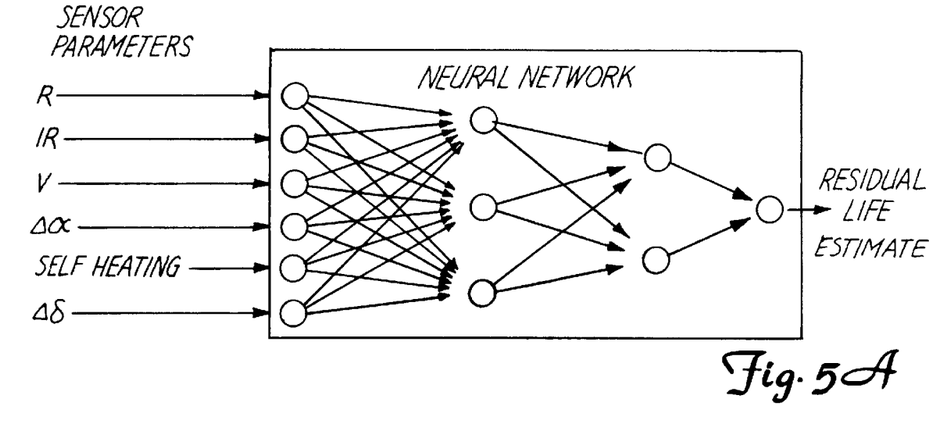
FIG. 5A is a diagram showing a neural network with a plurality of secondary input signals used to provide a residual lifetime estimate output from the transmitter.
Figure 5B:
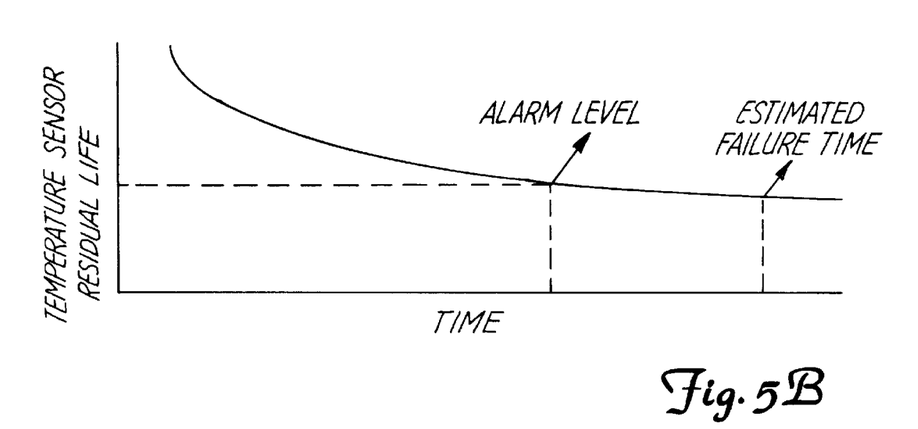
FIG. 5B is a graph of temperature sensor residual life versus time.

FIG. 5A shows a schematic for residual life estimation of temperature sensors using a neural network model, the six secondary signals include changes in sensor resistance ($\Delta R_1$), insulation resistance (IR), case to lead voltage ($V_P$), change in $\alpha$ ($\Delta\alpha$), self heating (SH) and change in $\delta$ ($\Delta\delta$). FIG. 5B is a graph of residual life versus time and shows sample outputs generated by the network of FIG. 5A.

The secondary signals may be used in various embodiments either alone, or in any of their combinations. The number of inputs may differ and depending on the type of the resistance based sensor, one or more of those parameters may not be included.

The secondary signals essentially represent the state of the RTD sensor 61 or of a thermocouple, as appropriate, and follow related patterns which allow microprocessor 52 to perform pattern recognition to identify failures and/or developing problems.

C. Threshold Circuitry

This embodiment of the diagnostic circuitry 52 uses a set of if—then rules to reach a conclusion on the status of the temperature sensor RTD 61 and may easily be implemented in analog circuitry. The previously mentioned input parameters (either all, or a subset) are monitored and their present values are compared to upper and lower boundaries. The upper and lower boundaries are empirically set by extensive testing of many of sensor 61. A decision is made based upon the comparison.

In a digital embodiment of this type of diagnostic circuitry, the values of the secondary signals are monitored and compared with their acceptable ranges by microprocessor 52.

The following is a sample if-then rule for sensor change in resistance ($\Delta R_1$):

If $\Delta R_1$ is multiplied by the percentage greater than RH, then residual life estimate of sensor 61 is n days.

where: X=percentage boundary $\Delta R_1$ is the change in the resistance value of the sensor over a known time period, RH is the upper boundary of the acceptable range.

Similarly, IR, $V_P$, SH, change in $\alpha$ ($\Delta\alpha$), and change in $\delta$ ($\Delta\delta$) will have corresponding upper and lower limits are used toward assigning the resultant values to be utilized in a decision making rules set.

Although the present invention has been described with reference to preferred embodiments, workers skilled in the art will recognize that changes may be made in form and detail without departing from the spirit and scope of the invention. In particular, the present invention may be used for voltage based sensors, such as a thermocouple or a voltage-based sensor.

What is claimed is:

1. A transmitter in a process control system, comprising:
   a resistance sensor sensing a process variable and providing a process variable output;
   sensor monitoring circuitry coupled to the resistance sensor providing a secondary signal related to a condition of the resistance sensor;
   analog to digital conversion circuitry coupled to the process variable output and the sensor monitoring circuitry and providing a digitized primary process variable output and a digitized secondary signal;
   output circuitry coupled to a process control loop for transmitting a residual life estimate;
   a memory storing a set of expected results related to the secondary signal and to the sensor; and
   diagnostic circuitry coupled to the digitized secondary signal and to the memory, for providing the residual life estimate as a function of the expected results in the memory, the digitized process variable output and the digitized secondary signal.

2. The transmitter of claim 1 wherein the diagnostic circuitry comprises a neural network.

3. The transmitter of claim 1 wherein the diagnostic circuitry comprises fuzzy logic.

4. The transmitter of claim 1 wherein the diagnostic circuitry includes an empirical model to determine the residual lifetime estimate output.

5. The transmitter of claim 1 wherein the diagnostic circuitry compares the secondary signal with a threshold to determine the residual lifetime estimate output.

6. The transmitter of claim 1 wherein the diagnostic circuitry includes an auto regression model which determines the residual lifetime of the sensor.

7. The transmitter of claim 1 wherein the secondary signal comprises change in sensor resistance.

8. The transmitter of claim 1 wherein the secondary signal comprises a voltage between a sheath and a lead of the resistance sensor.

9. The transmitter of claim 1 wherein the secondary signal comprises a resistance of insulation of the sensor.

10. The transmitter of claim 1 wherein the secondary signal comprises alpha ($\alpha$) of the resistance sensor.

11. The transmitter of claim 1 wherein the secondary signal comprises delta ($\delta$) of the resistance sensor.

12. The transmitter of claim 1 wherein the secondary signal comprises a self heating signal of the resistance sensor generated in response to a signal applied to the resistance sensor.

13. A method for providing a residual life estimate of a sensor, the method comprising:

sensing and digitizing a process variable output of the sensor to provide a digitized process variable sensor output;

sensing and digitizing a property of the sensor related to the lifetime of the sensor to provide a digitized secondary output;

storing an expected output related to the life of the sensor and the secondary output; and calculating a residual lifetime estimate as a function of the expected output, the digitized secondary output and the digitized primary process variable sensor output.

14. The method of claim 13 wherein the step of calculating comprises calculation with a neural network.

15. The method of claim 13 wherein the step of calculating comprises calculation with fuzzy logic.

16. The method of claim 13 wherein the step of calculating comprises comparing the secondary output with a threshold.

17. The method of claim 13 wherein the secondary output comprises change in sensor resistance.

18. The method of claim 17 wherein the secondary output comprises a voltage between a sheath and a lead of the sensor.

19. The method of claim 13 wherein the secondary output comprises a resistance of insulation of the sensor.

20. The method of claim 13 wherein the secondary output comprises alpha ($\alpha$) of the sensor.

21. The method of claim 13 wherein the secondary output comprises delta ($\delta$) of the sensor.

22. The method of claim 13 wherein the secondary signal comprises a self-heating signal of the sensor generated in response to a signal applied to the sensor.

* * * * *